Patented Feb. 18, 1936

2,030,877

UNITED STATES PATENT OFFICE 2,030,877

PRODUCTION OF DERIVATIVES OF N-DIHYDRO-1,2,2',1'-ANTHRAQUINONE AZINE

Frank Willard Johnson, Pennsgrove, N. J., assignor to E. I. du Pont de Nemours & Company, Wilmington, Del., a corporation of Delaware No Drawing. Application August 20, 1932, Serial No. 629,751

13 Claims. (Cl. 260—31)

This invention relates to condensation products of the anthraquinone series, more particularly anthraquinone azine derivatives, and processes for the production thereof.

It is an object of the invention to produce condensation products of the anthraquinone series by condensing 2-amino-1-chloro-anthraquinones having the 3-position blocked by a substituent group. A further object is the provision of a new and improved process for condensing 2-amino-1-chloro-3-halogen anthraquinones. A still further and more specific object is the production of 3,3'-dichloro-anthraquinone-1,2,2',1'-N-dihydroazines by a reaction which proceeds easily and smoothly with relatively high yields. Other objects will appear hereinafter.

These objects are accomplished by condensing 2-amino-1-chloro-anthraquinones having the 3-position blocked by a substituent group in the presence of cuprous and/or cupric bromide. The condensation is preferably effected by heating the 2-amino-1-chloro-anthraquinone derivative in a liquid reaction medium together with the copper bromide catalyst and an acid binding agent. It is preferable also, that the reaction mixture be stirred or agitated during the condensation. The product may be isolated in any suitable manner, for example, by filtering and washing out the liquid reaction medium, acid binder and catalyst with solvents or by steam distilling off the liquid reaction medium, after which the dye may be separated by filtration and washed with water.

While the invention is susceptible of considerable variation and modification in the manner of its practical application, particularly as regards the character of the 2-amino-1-chloroanthraquinone derivatives employed, the catalyst, acid binding agents, solvent or suspension medium, temperatures, proportions of materials, and exact manner of procedure, the following examples will illustrate how the invention may be practiced. The proportions are given in parts by weight.

Example I

Ten (10) parts of 2-amino-1,3-dichloroanthraquinone, 7 parts of dry sodium acetate, 0.5 part of cupric bromide and 100 parts of naphthalene are heated together at a temperature of about 175° C., with or without exclusion of air, until no further formation of dye takes place. The melt is diluted with solvent naphtha and filtered after washing out the naphthalene with solvent naphtha. The latter is removed with alcohol and the product finally washed with water. The dye is obtained in blue crystals in an excellent state of purity.

Example II

Ten (10) parts of 2-amino-1,3-dichloroanthraquinone, 7 parts anhydrous sodium acetate, 0.5 part cuprous bromide and 100 parts naphthalene are heated together at about 185° C. with good agitation until no more dye is formed and the resultant solid product is recovered as described in Example I. It is a blue dye yielding dyeings of excellent fastness to light, soap, boiling and chlorine and having most probably the following structural formula:

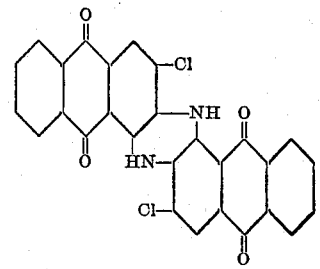

The preparation of 2-amino-1-chloroanthraquinone derivatives employed as intermediates in accordance with the present invention is described in the literature and patents. Thus, 2-amino-1,3-dichloroanthraquinone may be obtained by chlorinating 2-amino-1-chloroanthraquinone or the methods described by Junghaus (Ann. 399, 316 (1913)) may be used, or 2-aminoanthraquinone may be chlorinated by means of sulfuryl chloride in benzene suspension. The crude intermediates may be used as such in the condensation, but a better yield and purer product is obtained if they are purified by crystallization from an organic solvent or by dilution of a sulfuric acid solution of the intermediate to a suitable concentration, say 80%, filtering, washing with dilute sulfuric acid and finally boiling up with water. If desired, the chlorination of the 2-amino-anthraquinone and the subsequent condensation may be carried out in one medium, without isolation of the intermediate.

This invention is generally applicable to the condensation of 2-amino-1-chloro-anthraquinones having the 3-position blocked by a substituent group. As examples of such compounds may be mentioned 2-amino-1-chloro-3-anthraquinone carboxylic acid, 2-amino-1,3-dichloroanthraquinone, 2-amino-1-chloro-3-brom-anthraquinone, 2-amino-1,3,6-trichloro-anthraquinone, 2-amino-1,3,7-trichloro-anthraquinone, 2-amino-1-chloro-3-methyl-anthraquinone, 2 - amino -1- chloro -3- ethyl-anthraquinone, 2-amino -1- chloro -3- benzoyl - anthraquinone, 2-amino-1-chloro-3-benzoylamino - anthraquinone, 2-amino -1- chloro -3- benzyl-anthraquinone, 2-amino-1-chloro-3-phenyl-anthraquinone, 2-amino-1-chloro-3-anthraquinone sulfonic acid, 2-amino -1- chloro -3- methyl -6- methoxy-anthraquinone, 2-amino-1-chloro-3-methyl-6-ethoxy-anthraquinone, 2-amino-1-chloro-3,4-dimethyl-anthraquinone, 2-amino-1,3-dichloro-6-methyl-anthraquinone, 2-amino-1,3-dichloro-6-nitro-anthraquinone. The results obtained have been particularly advantageous in the application of the invention to the condensation of 2-amino-1,3-dichloro-anthraquinone to 3,3'-dichloro-anthraquinone - 1,2,2',1'-N-dihydro - azine. This product which is the blue dye obtained as described in Examples I and II, contains about 13.9% by weight of chlorine and possesses excellent dyeing characteristics. In general, in practicing the invention it is preferable for the production of anthraquinone azine derivatives that the 4-position of the intermediate should not be occupied by a halide or other group which may give rise to an anthrimide condensation.

The temperature employed in the condensation may vary within relatively wide limits depending largely upon the nature of the intermediate but should preferably be above about 150° C. and below the temperature giving rise to decomposition of the compounds involved in the reaction. Generally speaking, it is desirable to employ temperatures within the range of about 165°–190° C. and especially desirable results are obtained when the temperature employed is about 175–185° C.

The nature and proportions of the acid-binding agent and solvent or suspending medium employed in the condensation are also subject to considerable variation. As acid-binding agents sodium acetate and/or sodium carbonate are preferably employed, the proportions thereof being preferably in excess of the amount required to neutralize the acid set free by the condensation reaction. As examples of high boiling solvents or suspending media naphthalene, nitrobenzene, chlorobenzenes and nitro-toluene may be mentioned. It will be understood, of course, that other acid-binding agents such as sodium bicarbonate, alkaline earth hydroxides, etc., may be used and other solvents or suspension media which are liquids at the reaction temperature and which are inert or do not affect the reaction unfavorably may be employed. It will further be recognized that certain additions may be made to the melt for specific purposes, such as compounds having a reduction action (e. g. hydrogenated naphthalene, sodium phenolate, etc.) to reduce the amount of oxidation.

Instead of using catalysts consisting of cuprous or cupric bromide, mixtures of salts such as may be expected under the conditions of the condensation to react, at least in part, to give the catalyst named may be employed. Such mixtures are for example, copper acetate and/or copper carbonate with potassium, sodium, calcium, and/or barium bromides.

A particular advantage of the invention is the production of anthraquinone condensation products such as anthraquinone azine derivatives from intermediates which heretofore have not been successfully employed for this purpose. The use of these intermediates is especially important from the economic point of view because they can be produced very simply in high yields.

As many apparent and widely different embodiments of this invention may be made without departing from the spirit thereof, it is to be understood that I do not limit myself to the foregoing examples or description except as indicated in the following claims.

I claim:
1. In a process of producing condensation products of the anthraquinone series, the step which comprises condensing a 2-amino-1-chloro-anthraquinone having the 3-position blocked with an inert substituent group in the presence of a copper bromide.
2. In a process of producing condensation products of the anthraquinone series, the step which comprises condensing a 2-amino-1-chloro-anthraquinone having the 3-position blocked with an inert substituent group in a liquid reaction medium in the presence of a copper bromide and an acid binding agent.
3. A process of preparing condensation products of the anthraquinone series which comprises condensing a 2-amino-1-chloro-anthraquinone having the 3-position blocked with an inert substituent group in a liquid reaction medium maintained at a temperature above about 150° C. in the presence of a copper bromide and an acid binding agent.
4. A process of preparing condensation products of the anthraquinone series which comprises condensing a 2-amino-1-chloro-3-halogen-anthraquinone in the presence of a copper bromide.
5. The process of producing 3,3'-dichloro-anthraquinone-1,2,2',1'-N-dihydro-azine which comprises condensing 2-amino-1,3-dichloro-anthraquinone in the presence of a copper bromide.
6. The process of producing 3,3'-dichloro-anthraquinone-1,2,2',1'-N-dihydro-azine which includes agitating 2-amino-1,3-dichloro-anthraquinone at a temperature of about 175°–185° C. in the presence of cuprous bromide, sodium acetate and an inert solvent medium.
7. The process of producing a dye which includes heating together at a temperature of about 175–185° C., and with agitation, about 10 parts, by weight, of 2-amino-1,3-dichloro-anthraquinone, 7 parts of sodium acetate, 0.5 part of cuprous bromide and about 100 parts of naphthalene.
8. In a process of producing condensation products of the anthraquinone series, the step which comprises condensing a 2-amino-1-chloro-anthraquinone having the 3-position blocked with an inert substituent group and not containing halogen in the 4-position, in the presence of a copper bromide.
9. In a process of producing condensation products of the anthraquinone series, the step which comprises condensing a 2-amino-1-chloro-anthraquinone having the 3-position blocked with an inert substituent group and having the 4-position free, in the presence of a copper bromide.
10. In a process of producing condensation products of the anthraquinone series, the step which comprises condensing a 2-amino-1-chloro-anthraquinone having the 3-position blocked with an inert substituent group and having the 4-position free, in a liquid reaction medium in the presence of a copper bromide and an acid binding agent.
11. A process of preparing condensation products of the anthraquinone series which comprises condensing a 2-amino-1-chloro-anthraquinone having the 3-position blocked with an inert substituent group and having the 4-position free, in a liquid reaction medium maintained at a temperature above about 150° C. in the presence of a copper bromide and an acid binding agent.

12. A process of preparing condensation products of the anthraquinone series which comprises condensing a 2-amino-1-chloro-3-halogen-anthraquinone not containing a halogen in the 4-position, in the presence of a copper bromide.

13. A process of preparing condensation products of the anthraquinone series which comprises condensing a 2-amino-1-chloro-anthraquinone having the 3-position blocked with an inert substituent group and having the 4-, 5- and 8-positions free, in the presence of a copper bromide.

FRANK WILLARD JOHNSON.